(12) United States Patent
Choi

(10) Patent No.: US 9,000,612 B2
(45) Date of Patent: Apr. 7, 2015

(54) ENERGY STORAGE SYSTEM

(75) Inventor: Jungjin Choi, Suwon-si (KR)

(73) Assignee: Samsung SDI Co., Ltd., Gyeonggi-do (KR)

( * ) Notice: Subject to any disclaimer, the term of this patent is extended or adjusted under 35 U.S.C. 154(b) by 1071 days.

(21) Appl. No.: 12/961,324

(22) Filed: Dec. 6, 2010

(65) Prior Publication Data

US 2011/0133555 A1   Jun. 9, 2011

(30) Foreign Application Priority Data

Dec. 4, 2009  (KR) .................. 10-2009-0119698

(51) Int. Cl.
*H02J 9/00* (2006.01)
*H02J 7/35* (2006.01)
*H02J 3/38* (2006.01)
*H02M 3/158* (2006.01)

(52) U.S. Cl.
CPC . *H02J 7/35* (2013.01); *H02J 3/383* (2013.01); *H02M 3/1582* (2013.01); *Y02E 10/563* (2013.01); *Y02E 10/566* (2013.01)

(58) Field of Classification Search
CPC ................................ H02J 7/34; H02J 9/06
USPC ..................................... 307/65, 64
See application file for complete search history.

(56) References Cited

U.S. PATENT DOCUMENTS

| 4,801,859 | A | 1/1989 | Dishner |
| 6,181,100 | B1 | 1/2001 | Shoji |
| 7,432,614 | B2 * | 10/2008 | Ma et al. ........................ 307/31 |
| 7,432,619 | B2 * | 10/2008 | Voll et al. ...................... 307/147 |
| 7,456,519 | B2 * | 11/2008 | Takeda et al. .................. 307/64 |
| 7,456,591 | B2 * | 11/2008 | Jongen .......................... 315/502 |
| 7,880,334 | B2 * | 2/2011 | Evans et al. .................... 307/66 |
| 8,072,188 | B2 * | 12/2011 | Yorinobu et al. ............. 320/141 |
| 8,427,113 | B2 * | 4/2013 | Xing et al. .................... 320/145 |
| 2001/0004205 | A1 | 6/2001 | Miller |
| 2004/0207366 | A1 * | 10/2004 | Sung ............................. 320/140 |
| 2005/0208344 | A1 * | 9/2005 | Tan ................................ 429/7 |
| 2006/0023478 | A1 | 2/2006 | Takeda et al. |
| 2008/0084182 | A1 * | 4/2008 | Oberlin et al. ................ 320/116 |
| 2008/0215200 | A1 * | 9/2008 | Toth ............................... 701/22 |
| 2009/0027001 | A1 | 1/2009 | Haines |
| 2009/0200987 | A1 | 8/2009 | Saito et al. |
| 2010/0314945 | A1 | 12/2010 | Yamazaki et al. |

FOREIGN PATENT DOCUMENTS

| GB | 2 357 641 A | 6/2001 |
| JP | 06-178461 A | 6/1994 |
| JP | 6-178461 A | 6/1994 |

(Continued)

OTHER PUBLICATIONS

Korean Office Action dated Mar. 15, 2011 issued for Korean Patent Application No. KR 10-2009-0119698 which corresponds to the captioned application.

(Continued)

*Primary Examiner* — Rexford Barnie
*Assistant Examiner* — Toan Vu
(74) *Attorney, Agent, or Firm* — Knobbe, Martens, Olson & Bear, LLP

(57) ABSTRACT

An energy storage system is disclosed. The system can supply DC power from a battery to a DC load or from the DC load to the battery without inverting an AC power to the DC power.

2 Claims, 3 Drawing Sheets

(56) References Cited

FOREIGN PATENT DOCUMENTS

| | | |
|---|---|---|
| JP | 2001-128369 A | 5/2001 |
| JP | 2003-189477 A | 7/2003 |
| JP | 2008-035675 A | 2/2008 |
| KR | 10-2004-0056679 A | 7/2004 |
| KR | 10-2008-0113240 A | 12/2008 |
| KR | 10-2009-0092041 A | 8/2009 |

OTHER PUBLICATIONS

Chinese Office Action dated Jul. 26, 2013 for Chinese Patent Application No. CN 201010579161.2 which shares priority of Korean Patent Application No. KR 10-2009-0119698.

Chinese Office Action dated Jan. 17, 2013 for Chinese Patent Application No. CN 201010579161.2 which shares priority of Korean Patent Application No. KR 10-2009-0119698.

Gurkaynak et al., Control and Power Management of a Grid Connected Residential Ph Hybrid Electric Vehicle (PHEV) Load, Applied Power Electronics Conference and Exposition, 2009. APEC 2009. Twenty, Feb. 2009, pp. 2086-2091. Abstract.

Extended European Search Report dated Nov. 2, 2010 issued in European Application No. EP 10 17 3076 corresponding to Korean Patent Application No. KR 10-2009-0119698 which corresponds to the captioned application.

Japanese Office Action dated Sep. 4, 2012 for Japanese Patent Application No. JP 2010-163054 which shares priority of Korean Patent Application No. KR 10-2009-0119698.

\* cited by examiner

ENERGY STORAGE SYSTEM

CROSS-REFERENCE TO RELATED APPLICATIONS

This application claims priority to and the benefit of Korean Patent Application No. 10-2009-0119698 filed on Dec. 4, 2009, the entire content of which is incorporated herein by reference.

BACKGROUND

1. Field

The field of technology relates to an energy storage system.

2. Description Of The Related Technology

An energy storage system can supply power to an alternating current (AC) load. The energy storage system is connected to a solar cell and to a power grid and stores a surplus power in a secondary battery. The energy storage system may, for example, supply the power, which is stored in the secondary battery, to the AC load when a fault occurs in the solar cell and the power grid.

A direct current (DC) load may be connected to the AC load and receive power from the energy storage system through the AC load. However, since AC power is supplied to the AC load, the AC power should be inverted into DC power for supplying the power of the energy storage system to the DC load. Such inverting uses a separate adapter between the AC load and the DC load, and decreases the efficiency of power that is supplied to the DC load.

SUMMARY OF CERTAIN INVENTIVE ASPECTS

One aspect is an energy storage system. The system includes a first battery, and a bi-directional converter connected to the first battery, where the bi-directional converter is configured to convert power from the first battery into DC power. The system also includes an integration controller connected to the bi-directional converter, where the integration controller is configured to select a discharge mode and a charge mode for the first battery so as to control discharge and charge of the first battery. The system also includes a DC load connected to the bi-directional converter, where the DC load includes a second battery. The DC load receives power from the first battery through the bi-directional converter when the first battery is in the discharge mode, and power of the second battery is converted into a DC power by the bi-directional converter and the converted DC power is supplied to the first battery when the first battery is in the charge mode.

BRIEF DESCRIPTION OF THE DRAWINGS

The above and other features and advantages will become more apparent to those of ordinary skill in the art through the below discussion of exemplary embodiments with reference to the attached drawings, in which.

DETAILED DESCRIPTION OF CERTAIN INVENTIVE EMBODIMENTS

Example embodiments will now be described more fully hereinafter with reference to the accompanying drawings; however, various inventive aspects may be embodied in different forms and should not be construed as being limited to the embodiments set forth herein. Rather, these embodiments are provided so that this disclosure will be thorough and complete.

In this disclosure, when one part (or element, device, etc.) is referred to as being 'connected' to another part (or element, device, etc.), it should be understood that the former part can be 'directly connected' to the latter part, or 'electrically connected' to the latter part via an intervening part (or element, device, etc.). Furthermore, when it is described that one comprises (or includes or has) some elements, it should be understood that it may comprise (or include or have) only those elements, or it may comprise (or include or have) other elements as well as those elements.

Hereinafter, embodiments will be described in detail with reference to the accompanying drawings.

Figure 1:
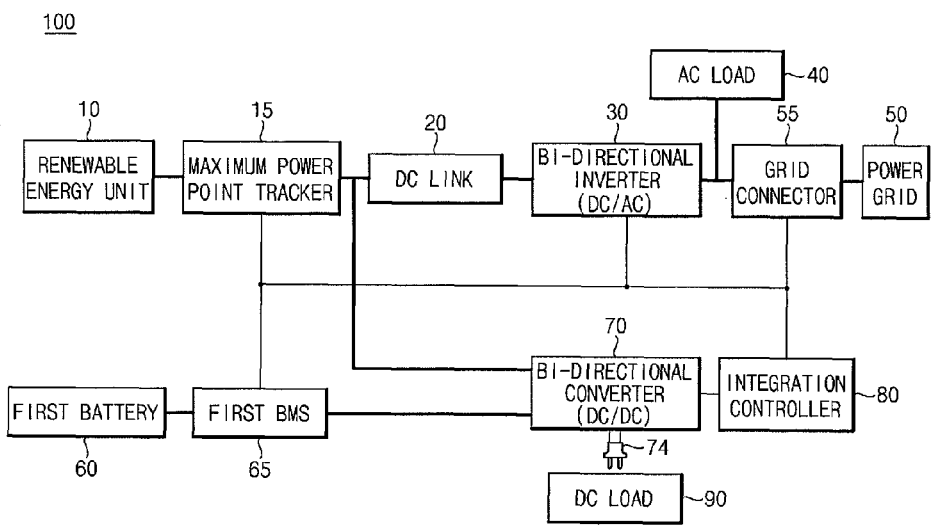
FIG. 1 illustrates a block diagram of an energy storage system according to an embodiment.
Figure 2:
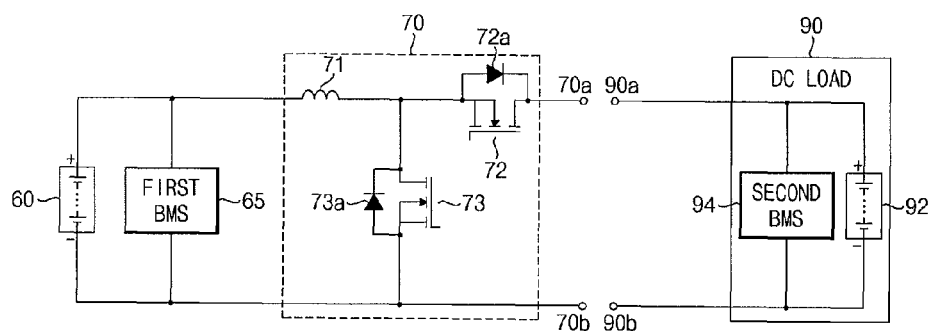
FIG. 2 illustrates a circuit diagram of a first battery, bi-directional converter and DC load in FIG. 1.

FIG. 1 illustrates a block diagram of an energy storage system according to an embodiment. FIG. 2 illustrates a circuit diagram of a first battery, bi-directional converter and DC load in FIG. 1.

Referring to FIGS. 1 and 2, an energy storage system 100 according to an embodiment may include a renewable energy unit 10, a maximum power point tracker 15, a DC link 20, a bi-directional inverter 30, an AC load 40, a power grid 50, a grid connector 55, a first battery 60, a first Battery Management System (BMS) 65, a bi-directional converter 70, an integration controller 80, and a DC load 90.

The renewable energy unit 10 may include, for example, a solar cell, a wind power plant, a tidal power plant, or a geothermal power plant. The renewable energy unit 10 produces energy, which is generated from nature, for example, from solar heat, sunlight, wind, tidal power or geothermal heat, and converted to electrical energy to supply renewable energy. The renewable energy unit 10 configured with a solar cell will be described below as an example.

The maximum power point tracker 15 is connected to the renewable energy unit 10, and tracks the maximum power point of the renewable energy unit 10 to extract the maximum power. The maximum power point tracker 15 converts the extracted maximum power into DC power. For this, the maximum power point tracker 15 may include a maximum power point tracking controller and a boost DC/DC converter. The maximum power point tracking controller performs a process to track the maximum power point of the renewable energy unit 10 as the power of the renewable energy unit 10 varies according to the change of solar radiation and temperature. The boost DC/DC converter converts the maximum power of the renewable energy unit 10 into DC power.

The DC link 20 is connected to the maximum power point tracker 15, and stores power supplied from the maximum power point tracker 15. For this, the DC link 20 may be implemented with a capacitor.

The bi-directional inverter 30 is connected to the DC link 20, and inverts the DC power stored in the DC link 20, into AC power.

The AC load 40 is connected to the bi-directional inverter 30, and may receive power from the bi-directional inverter 30.

The AC load 40 may, for example, be a home or an industrial facility that uses the AC power.

The power grid 50 provides grid power and is an electrical connection system that may be located across a broad region and may include a power plant, a substation, and power transmission lines. Herein, the power grid may be an AC power source. The power grid 50 is connected to the bi-directional inverter 30 and an AC load 40. The power grid 50 may receive power from the renewable energy unit 10 through the bi-directional inverter 30 or supply power from the power grid to the AC load 40.

The grid connector 55 is connected to the bi-directional inverter 30, the AC load 40 and the power grid 50, and controls the connection and disconnection of the power grid 50. For example, when a problem such as a power failure occurs, the grid connector 55 disconnects the power grid 50 from the bi-directional inverter 30 and the AC load 40, thereby enabling a manager to solve the fault of the power grid 50 without the AC load 40. When the fault of the power grid 50 has been solved, the grid connector 55 again connects the power grid 50 to the bi-directional inverter 30 and the AC load 40.

The first battery 60 is connected to the renewable energy unit 10 and the power grid 50, and supplies a first battery power. Herein, the first battery power may be DC power. The first battery 60 may be a secondary battery capable of charge/discharge, and may be configured with a plurality of small-capacity battery cells or one large-capacity battery cell to store and source a large-scale power.

The first battery management system (BMS) 65 is connected to the both terminals "+ and –" of the first battery 60, and maintains and manages the state of the first battery 60. Specifically, the first BMS 65 may monitor the voltage, current and temperature of the first battery 60 for securing the stability of the first battery 60, and may check State Of Charge (SOC), State Of Health (SOH), battery cell balancing and a cooled state for the optimal state of the first battery 60, thereby controlling the charge/discharge of the first battery 60.

The bi-directional converter 70 is connected between the renewable energy unit 10, the power grid 50 and the first battery 60. Specifically, in this embodiment, the bi-directional converter 70 is connected to the maximum power point tracker 15, the DC link 20 and the first BMS 65. The bi-directional converter 70 may convert the power from the DC link 20 or from the power grid, which has been inverted into DC power by the bi-directional inverter 30 to supply power to the first battery 60. In addition, the bi-directional converter 70 may convert the power of the first battery 60 into a DC power for the DC link 20. For this, as illustrated in FIG. 2, the bi-directional converter 70 may include a coil 71, a first switch 72 and a second switch 73. Hereinafter, the configuration of the bi-directional converter 70 will be described with reference to FIG. 2. Herein, a connection between the DC link 20 and the bi-directional converter 70 is similar to a connection between the first battery 60 and the bi-directional converter 70.

The coil 71 is connected between the first terminal '+' of the first battery 60 and the first external terminal 70a of the bi-directional converter 70.

The first switch 72 includes a first terminal connected to the coil 71, and a second terminal connected to the first external terminal 70a of the bi-directional converter 70. The first switch 72 may include a parasitic diode 72a having an anode connected to the first terminal of the first switch 72 and a cathode connected to the second terminal of the first switch 72. In FIG. 2, the first switch 72 is illustrated as a Metal Oxide Semiconductor Field Effect Transistor (MOSFET), but may be implemented with another switching device. The first terminal of the first switch 72 may be a source terminal, and the second terminal of the first switch 72 may be a drain terminal.

The second switch 73 includes a first terminal that is connected to the second terminal '–' of the first battery 60 and the second external terminal 70b of the bi-directional converter 70, and a second terminal that is connected to the coil 71 and the first switch 72. The second switch 73 may include a parasitic diode 73a having an anode connected to the first terminal of the second switch 73 and a cathode connected to the second terminal of the second switch 73. In FIG. 2, the second switch 73 is illustrated as a MOSFET, but may be implemented with another switching device. The first terminal of the second switch 73 may be a source terminal, and the second terminal of the second switch 73 may be a drain terminal.

The bi-directional converter 70 having the above-described configuration may convert the power of the first battery 60 according to the turn-on/off operations of the first and second switches 72 and 73. Specifically, the bi-directional converter 60 may control the duty ratio of the first and second switches 72 and 73 to boost or drop the power of the first battery 60. Accordingly, the bi-directional converter 70 may convert the power of the first battery 60 into a desired DC power. Therefore, the bi-directional converter 70 may supply a DC power suitable for the DC load 90. The bi-directional converter 70 may boost the power from the first battery 60 when the duty ratio of the first and second switches 72 and 73 is equal to or greater than a certain value (for example, 0.5) in the discharge mode of the first battery 60. In addition, the bi-directional converter 70 may reduce the power of the first battery 60 when the duty ratio of the first and second switches 72 and 73 is less than the certain value in the discharge mode of the first battery 60. In some embodiments, the bi-directional converter 70 may include a plug 74 for connecting and disconnecting the DC load 90.

The integration controller 80 monitors and controls the maximum power point tracker 15, the bi-directional inverter 30, the grid connector 55, the first BMS 65 and the bi-directional converter 70. The integration controller 80 monitors the states of the renewable energy unit 10 and power grid 50 through the maximum power point tracker 15 and the grid connector 55, sets the discharge mode and charge mode of the first battery 60, and allows the first BMS 65 to control the discharge and charge of the first battery 60.

The DC load 90 may be connected or disconnected to/from the bi-directional converter 70 through the plug 74 of the bi-directional converter 70. That is, the first and second external terminals 90a and 90b of the DC load 90 may be connected or disconnected to/from the first and second external terminals 70a and 70b of the bi-directional converter 70 through the plug 74. The DC load 90 may include a second battery 92 and a second BMS 94.

The second battery 92 has a first terminal '+' connected to the first external terminal 90a of the DC load 90 and a second terminal '–' connected to the second external terminal 90b of the DC load 90, and supplies second battery power. Herein, the second battery power may be DC power, and may be from the second battery 92. The second battery power may be produced through the driving of a separate power source device (for example, a motor) that is mounted inside the DC load 90. The second battery 92 may be a secondary battery capable of charge/discharge similar to the first battery 60, and may be configured with a plurality of small-capacity battery cells or one large-capacity battery cell to implement a large-scale power.

The second BMS 94 is connected to the both terminals "+ and −" of the second battery 92, and maintains and manages the state of the second battery 92. Specifically, the second BMS 94 may monitor the voltage, current and temperature of the second battery 92 for securing the stability of the second battery 92, and may check State Of Charge (SOC), State Of Health (SOH), battery cell balancing and a cooled state for the optimal state of the second battery 92, thereby controlling the charge/discharge of the second battery 92.

The DC load 90 having the above-described configuration may receive power from the first battery 60 as a DC power without inversion in the discharge mode of the first battery 60 when it is connected to the bi-directional converter 70. In addition, the DC load 90 may supply power to the second battery 92 as a DC power, in the charge mode of the first battery. The power of the second battery 92 may be boosted or dropped by controlling the duty ratio of the first and second switches 72 and 73 through the bi-directional converter 70 in the charge mode of the first battery 60. That is, the bi-directional converter 70 may boost the power from the second battery when the duty ratio of the first and second switches 72 and 73 is equal to or greater than the certain value (for example, 0.5) in the charge mode of the first battery 60, and the bi-directional converter 70 may drop the power of the second battery when the duty ratio of the first and second switches 72 and 73 is less than a certain value in the charge mode of the first battery 60. Herein, the DC load 90 may be mobile electronic equipment, a notebook computer, an airplane or a hybrid car. Hereinafter, the discharge and charge operation of the first battery 60 will be described in detail when the DC load 90 is connected to the bi-directional converter 70.

Figure 3:
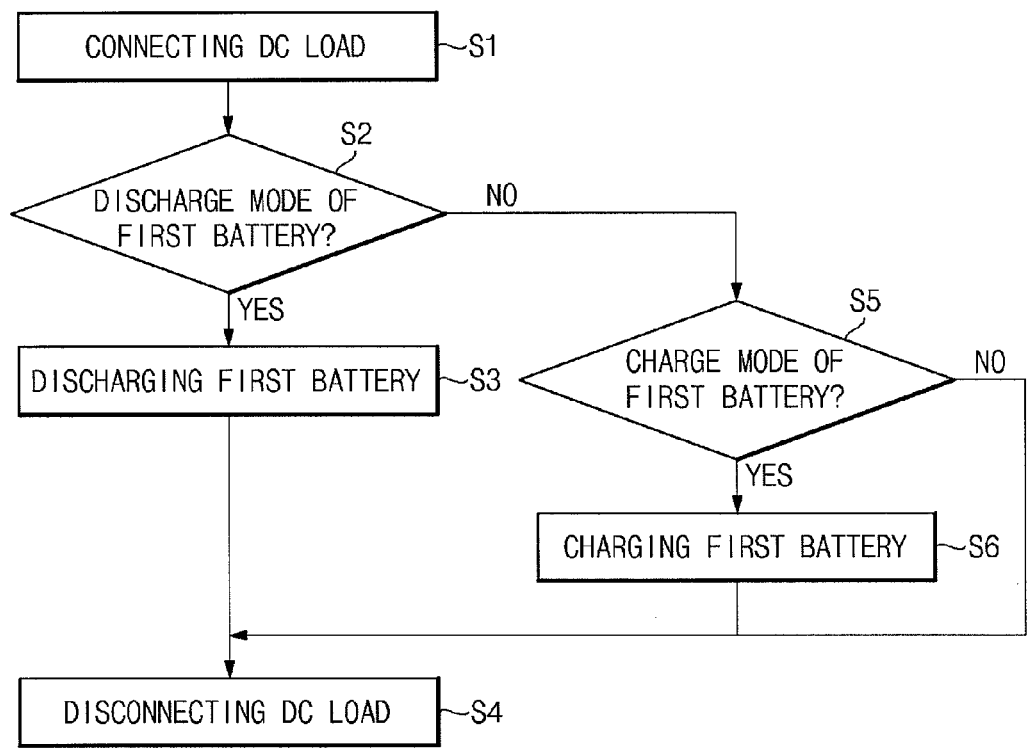
FIG. 3 illustrates a flow chart of an operation for discharging and charging the first battery which is connected to a DC load.
Figure 4:
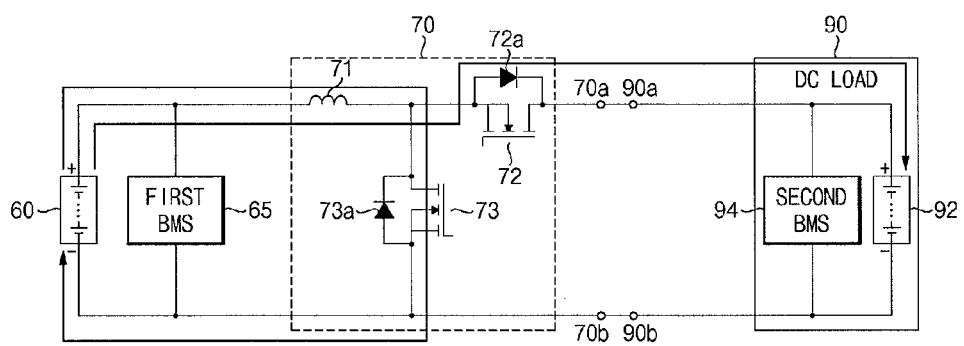
FIG. 4 illustrates a circuit diagram of a discharge operation of the first battery.
Figure 5:
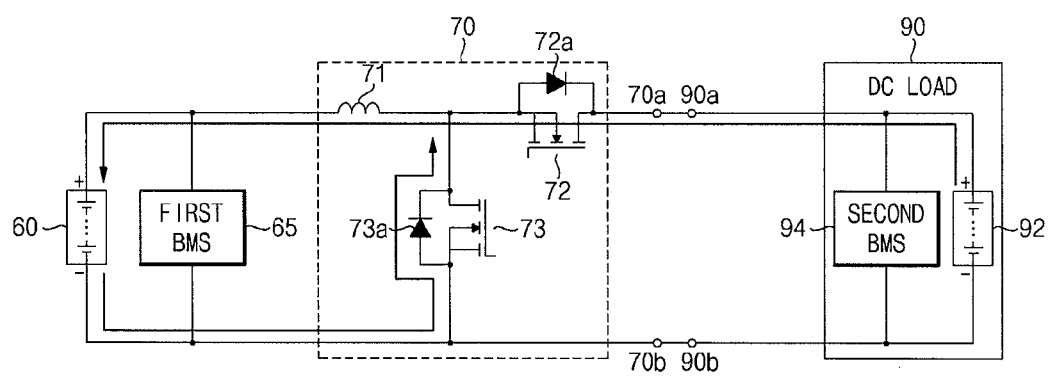
FIG. 5 illustrates a circuit diagram of a charge operation of the first battery.

FIG. 3 illustrates a flow chart of an operation for discharging and charging the first battery which is connected to a DC load. FIG. 4 illustrates a circuit diagram for describing a discharge operation of the first battery. FIG. 5 illustrates a circuit diagram for describing a charge operation of the first battery.

Referring to FIGS. 3 through 5, the DC load 90 is connected to the bi-directional converter 70 through the plug 74 (see FIG. 1) of the bi-directional converter 70, in operation S1 of connecting the DC load.

In operation S2 of checking the discharge mode of the first battery, the integration controller 80 checks the second battery 92 that in the DC load 90. The integration controller 80 sets the discharge mode of the first battery 60 when the second battery 92 is not at full-charge. The integration controller 80 communicates with the second BMS 94 for checking the second battery 92. For this, the integration controller 80 and the second BMS 94 communicate with each other.

In operation S3, the first battery 60 performs discharge according to the discharge mode that is set by the integration controller 80.

As illustrated in FIG. 4, the first switch 72 is first turned off and the second switch 73 is turned on, in the discharge mode of the first battery 60. At this point, power from the first battery 60 is stored in the coil 71. When the first switch 72 is turned on and the second switch 73 is turned off, the power stored in the coil 71 is supplied to the DC load 90. Specifically, the power of the first battery 60 is boosted or dropped according to the duty ratio of the first and second switches 72 and 73 and is supplied to the DC load 90. Thus, the first battery 60 is discharged.

In FIG. 4, although it is illustrated that the first battery 60 is discharged and power is supplied to the second battery 92, alternatively, the DC link 20 may be discharged and thereby renewable energy power or a power grid power may be supplied to the second battery 92 through the bi-directional converter 70. Accordingly, when sufficient power is not charged in the DC link 20 because a fault occurs in the renewable energy unit 10 or the power grid 30, the first battery 60 is discharged and thereby power from the first battery is supplied to the second battery 92. On the other hand, when sufficient power is not stored in the first battery 60, the DC link 20 is discharged and thereby the renewable energy power or the power grid power is supplied to the second battery 92.

In operation S4, when the discharge of the first battery 60 is completed, the DC load 90 is disconnected from the bi-directional converter 70 through the plug 74 (see FIG. 1) of the bi-directional converter 70.

When the discharge mode of the first battery 60 is not used (i.e., when only the power of the second battery 92 is used), in operation S2, the integration controller 80 checks the power of the first battery 60 in operation S5. When the power of the first battery 60 is not at full-charge, the integration controller 80 starts the charge mode of the first battery 60. The integration controller 80 communicates with the first BMS 65 for checking the first battery 60. For this, the integration controller 80 and the first BMS 65 are configured to communicate with each other.

In operation S6, the first battery 60 is charged according to a charge mode that is started by the integration controller 80.

As illustrated in FIG. 5, in the charge mode of the first battery 60, the first switch 72 is turned on and the second switch 73 is turned off, and power of the second battery 92 is stored in the coil 71. The first switch 72 is subsequently turned off and the second switch 73 is turned on, and the power stored in the coil 71 is supplied to the first battery 60. Accordingly, the power output of the second battery 92 to the first battery 60 is boosted or dropped by controlling the duty ratio of the first and second switches 72 and 73. When the charge of the first battery 60 is completed in operation S6 or when the charge mode of the first battery 60 is not set in operation S5, operation S4 is performed.

In FIG. 5, although it is illustrated that the power of the second battery 92 is supplied to the first battery 60 and thereby the first battery 60 is charged, the second battery 92 may be supplied to the DC link 20 and thereby the DC link 20 may be charged. In this case, the power of the second battery supplied to the DC link 20 may be inverted into an AC power by the bi-directional inverter 30 and thereby the AC power may be supplied to the AC load 40 or the power grid 50.

As described above, by connecting the DC load 90 to the bi-directional converter 70 that is connected to the first battery 60, the energy storage system 100 may convert the power of the first battery 60 into a DC power suitable for the DC load 90 without inversion to supply the converted DC power to the DC load 90, or may convert the power of the second battery into a DC power to supply the converted DC power to the first battery 60.

Accordingly, the energy storage system 100 according to an embodiment need not connect a separate adapter for an inversion operation to invert AC power into DC power. One result is an increase the in efficiency of the system 100.

While certain exemplary embodiments have been described, it is to be understood that the invention is not limited to the disclosed embodiments, but, on the contrary, is intended to cover various modifications and equivalent arrangements.

What is claimed is:

1. An energy storage system comprising:
a first battery;
a bi-directional converter connected to the first battery, wherein the bi-directional converter is configured to convert the power from the first battery into a first DC power;
an integration controller connected to the bi-directional converter, wherein the integration controller is configured to select a discharge mode and a charge mode for the first battery so as to control discharge and charge of the first battery;
a second battery;
a DC load connected to the bi-directional converter and the second battery, wherein the DC load receives power from the first battery through the bi-directional converter when the first battery is in the discharge mode, and power of the second battery is converted into a second DC power by the bi-directional converter and the second DC power is supplied to the first battery when the first battery is in the charge mode, and the bi-directional converter includes a plug for connecting and disconnecting the DC load
wherein the bi-directional converter further comprises a coil connected between a first terminal of the first battery and a first external terminal of the bi-directional converter; a first switch comprising a first terminal connected to the coil, and a second terminal connected to the first external terminal of the bi-directional converter; and a second switch comprising a first terminal connected to a second terminal of the first battery and to a second external terminal of the bi-directional converter, and a second terminal connected to the coil and to the first switch; and
the bi-directional converter boosts the power of the first battery when a duty ratio of the first and second switches is equal to or greater than a certain value and the first battery is in the discharge mode, and
the bi-directional converter drops the power of the first battery when the duty ratio of the first and second switches is less than the value and the first battery is in the discharge mode.

2. An energy storage system comprising:
a first battery;
a bi-directional converter connected to the first battery, wherein the bi-directional converter is configured to convert the power from the first battery into a first DC power;
an integration controller connected to the bi-directional converter, wherein the integration controller is configured to select a discharge mode and a charge mode for the first battery so as to control discharge and charge of the first battery;
a second battery;
a DC load connected to the bi-directional converter and the second battery, wherein the DC load receives power from the first battery through the bi-directional converter when the first battery is in the discharge mode, and power of the second battery is converted into a second DC power by the bi-directional converter and the second DC power is supplied to the first battery when the first battery is in the charge mode, and the bi-directional converter includes a plug for connecting and disconnecting the DC load
wherein the bi-directional converter further comprises a coil connected between a first terminal of the first battery and a first external terminal of the bi-directional converter; a first switch comprising a first terminal connected to the coil, and a second terminal connected to the first external terminal of the bi-directional converter; and a second switch comprising a first terminal connected to a second terminal of the first battery and to a second external terminal of the bi-directional converter, and a second terminal connected to the coil and to the first switch; and
the bi-directional converter boosts the power of the second battery when a duty ratio of the first and second switches is equal to or greater than a certain value and the first battery is in the charge mode, and
the bi-directional converter drops the power of the second battery when the duty ratio of the first and second switches is less than the value and the first battery is in the charge mode.

\* \* \* \* \*